United States Patent [15] 3,694,458
Helsley [45] Sept. 26, 1972

[54] 1-NITROSOPYRROLIDINES

[72] Inventor: Grover Cleveland Helsley, Richmond, Va.

[73] Assignee: A. H. Robins Company, Incorporated, Richmond, Va.

[22] Filed: Aug. 31, 1970

[21] Appl. No.: 68,590

[52] U.S. Cl............260/326.5 L, 260/326.5 R, 260/326.85, 424/274
[51] Int. Cl. ................................................C07d 27/02
[58] Field of Search....................260/326.5 R, 326.8

[56] References Cited

UNITED STATES PATENTS 3,090,786    5/1963    Levering et al............260/293

*Primary Examiner*—Alex Mazel
*Assistant Examiner*—Joseph A. Narcavage
*Attorney*—G. William King and Norman D. Dawson

[57] ABSTRACT

1-Nitrosopyrrolidines having anticonvulsant activity are disclosed. The compounds are prepared from 3-(mono- and disubstituted)pyrrolidines by nitrosation. Substituents in the 3-position are selected from a combination of hydroxyl, α-phenyl-α-hydroxybenzyl, α-alkyl-α-hydroxybenzyl, phenyl, trifluoromethylphenyl and phenoxy radicals.

7 Claims, No Drawings

1-NITROSOPYRROLIDINES

The present invention relates to certain novel heterocyclic compounds which may be referred to as 1-nitrosopyrrolidines and is more particularly concerned with 1-nitroso-3-(mono- and disubstituted)pyrrolidines.

The compounds of the present invention may be expressed generally by the following formula:

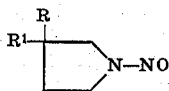

Formula I wherein;

R is selected from hydrogen and hydroxy, and $R^1$ is selected from α-phenyl-α-hydroxybenzyl, α-lower-alkyl-α-hydroxybenzyl, α-lower-alkyl-α-hydroxy-p-trifluoromethyl- benzyl, phenyl, trifluoromethylphenyl and 3,5-di-lower-alkyl phenoxy.

The compounds of the present invention have demonstrated utility as anticonvulsants in animals as determined by recognized pharmacological procedures. When convulsions were induced in mice using the supramaximal electroshock technique of Toman, J. E. P. et al., J. Neurophysiol. 9, 47(1946), anticonvulsant protection was afforded when the compounds were given intraperitoneally at dose levels of 20 to 200 mg./kg. and preferably at 20 to 80 mg./kg. The compounds of Examples 1, 2, and 3 afforded significant protection against pentylenetetrazole-induced convulsions in mice when administered intraperitoneally at a dose level of 30 to 200 mg./kg. and preferably at 40 to 100 mg./kg. The procedure of Swinyard et al, J. Pharm. Exptl. Therap. 106, 319(1959) was used.

Pharmacological data for the preferred compounds of the invention is listed in Table I below. The $ED_{50}$'s were determined using the method of Litchfield and Wilcoxin, J. Pharm. Exptl. Therap., 96, 99(1949).

TABLE I

| Ex. | R | $R^1$ | Electroshock $ED_{50}$ mg./kg. | Pentylene tetrazol $ED_{50}$ mg./kg. |
|---|---|---|---|---|
| 1 | H | —C(OH)(C$_6$H$_5$)$_2$ | 55 | 72 |
| 2 | H | —C(OH)(C$_6$H$_5$)C$_3$H$_7$ | 25 | 42 |
| 3 | H | —C(OH)(4-CF$_3$C$_6$H)CH$_3$ | | |
| 4 | OH | 3-CF$_3$-C$_6$H$_4$ | 37 | |

It is, therefore, an object of the present invention to provide novel 1-nitrosopyrrolidines useful as anticonvulsants. Other objects and advantages of this invention will be apparent to one skilled in the art, and still others will become apparent hereinafter.

In the definition of symbols in Formula I and where they appear elsewhere throughout this specification and in the claims, the terms have the following significance.

"Lower alkyl" includes straight and branched chain radicals of up to eight carbon atoms and is exemplified by such groups as methyl, ethyl, propyl, butyl, isopropyl, isobutyl, amyl, hexyl, heptyl, octyl, isooctyl and the like.

The novel compounds of the present invention having a nitro substituent in the 1-position of the pyrrolidine nucleus are prepared by the reaction of a 3-(mono- and disubstituted) pyrrolidine with sodium nitrite in an aqueous acidic medium. The selected pyrrolidine is dissolved in dilute mineral acid, preferably dilute hydrochloric acid. An aqueous solution of sodium nitrite is slowly added to the stirred aqueous acidic solution which is maintained at a temperature of from about 50° C. to about 80° C., and preferably at about 70° C. The stirred reaction mixture is maintained at about 70° C. for an additional period of time of from about 1 hour to 3 hours. The reaction mixture is cooled and the crude product either precipitates from the cooled reaction mixture, or it is extracted with an organic solvent such as chloroform. The crude product is purified by crystallization from a suitable solvent or by vacuum distillation.

The following preparations and examples are given by way of illustration only and are not to be construed as limiting.

PREPARATION OF INTERMEDIATES

The 3-(mono- and disubstituted) pyrrolidine intermediates used in the preparation of the novel 1-nitroso-3-(mono- and disubstituted) pyrrolidine of the present invention are known to the art and are either disclosed in the U.S. Pat. Nos. 2,787,264 and 3,479,370, or they can be prepared by the methods disclosed therein. Other intermediates can be prepared as shown by the following preparations.

PREPARATION 1

3-(m-Trifluoromethylphenyl) pyrrolidine Hydrochloride

A solution of 11.5 g. (0.05 mole) of 3-(m-trifluoromethylpheny)-3-pyrrolidinol in 200 ml. of 6N hydrochloric acid containing 4 g. of 10 percent palladium-on-charcoal catalyst was shaken in three atmospheres of hydrogen until one equivalent of hydrogen was absorbed. After cooling, the suspension was filtered and made basic with 50 percent sodium hydroxide. The oil which separated was extracted with ether and the combined extracts were washed with water. After drying over magnesium sulfate the solvent was evaporated. The non-viscous residual oil weighed 7.1 g. (65 percent yield). An ether solution of the free base was treated with an ether-hydrogen chloride solution and the hydrochloride salt which formed on standing was recrystallized from an isopropanol-isopropyl ether mixture; the hydrochloride salt melted at 111°–11

Analysis: Calculated for $C_{11}H_{13}ClNF_3$:
C,52.49; H,5.21; N,5.57
Found: C,52.34; H,5.28; N,5.54

PREPARATION 2

1-Benzyl-3-(3,5-dimethylphenoxy)pyrrolidine Hydrochloride

A stirred mixture of 244 g. (2.0 moles) of 3,5-dimethylphenol, 391 g. (2.0 moles) of 1-benzyl-3-chloropyrrolidine, 108 g. (2.0 moles) of sodium methoxide and one liter of dimethylformamide was heated at 110°–114° C. for 16 hours, cooled and treated with 1 liter of water. The oil which separated was extracted with benzene and was successively washed with 5 percent sodium hydroxide and water. The benzene layer was dried over magnesium sulfate and the benzene was evaporated from the dried solution. The residual oil was distilled at 145°–148° C./.05 mm.; the distillate weighed 154 g. (24 percent yield). A portion of the free base in dry ether was treated with ethereal hydrogen chloride and the white crystalline hydrochloride which formed was recrystallized from an isopropanol-isopropyl ether mixture. The hydrochloride melted at 158°–160.5° C.

Analysis: Calculated for $C_{19}H_{24}NOCl$:
C, 71.79; H, 7.61; N, 4.41
Found: C, 71.64; H, 7.58; N, 4.45

PREPARATION 3

3-(3,5-Dimethylphenoxy)pyrrolidine Hydrochloride.

A solution of 72 g. (0.25 mole) of 1-benzyl-3-(3,5-dimethylphenoxy)pyrrolidine in 250 ml. of 95 percent ethanol containing 4 g. of palladium-on-charcoal catalyst was shaken in 3 atmospheres of hydrogen at about 70° C. until one equivalent of hydrogen was absorbed. After cooling, the suspension was filtered and the ethanol evaporated. The residual oil was distilled at 93°–95 C./.05 mm. The colorless distillate weighed 41 g. (86 percent yield). A portion of the free base in isopropanol was treated with ethereal hydrogen chloride. The white salt which formed weighed 5.9 g. and melted at 133°–135° C.

Analysis: Calculated for $C_{12}H_{18}NOCl$:
C, 63.29; H, 7.97; N, 6.15
Found: C, 63.39; H, 7.94; N, 6.25

EXAMPLE 1

1-Nitroso-α,α-diphenyl-3-pyrrolidinemethanol

To a solution of 15 g. (0.059 mole) of α,α-diphenyl-3-pyrrolidine methanol in 55 ml. of 1.0 N hydrochloric acid maintained at ca. 70° C. was added slowly a solution of 4.2 g. (0.061 mole) of sodium nitrite in 20 ml. of water. The mixture was stirred for 2 hours at the same temperature, then cooled, and extracted with chloroform. The combined chloroform extracts were dried and the solvent was evaporated at reduced pressure yielding 9.1 g. (55 percent) of crude product which crystallized on standing. A sample was recrystallized from isopropanol-isopropyl ether and melted at 173°–175° C.

Analysis: Calculated for $C_{17}H_{18}N_2O_2$:
C,72.32; H,6.43; N,9.92
Found: C,72.64; H,6.38; N,9.84

EXAMPLE 2

1-Nitroso-α-phenyl-α-propyl-3-pyrrolidinemethanol

To a solution of 6.0 g. (0.028 mole) of α-phenyl-α-propyl- 3-pyrrolidinemethanol in 29 ml. of 1.0 N hydrochloric acid maintained at ca. 70° C. was added slowly a solution of 2.0 g. (0.029 mole) of sodium nitrite in 15 ml. of water. The mixture was stirred for 2 hours at the same temperature, cooled and the crystalline product which formed was separated by filtration. The white product weighed 4.7 g. (69 percent) and melted at 129°–131° C. The product melted at 131.5°–132.5°C. after it was recrystallized from isopropyl ether.

Analysis: Calculated for $C_{14}H_{20}N_2O_2$:
C,67.72; H,8.12; N,11.28
Found: C,67.75; H,8.17; N,11.18

EXAMPLE 3

1-Nitroso-α-methyl-α-(p-trifluoromethylphenyl)-3-pyrrolidinemethanol

To a stirred solution of 3.9 g. (0.015 mole) of α-methyl-αα-(p-trifluoromethylphenyl)-3-pyrrolidinemethanol in 60 ml. of 0.24 N hydrochloric acid maintained at ca. 70° was added slowly a solution of 1.1 g. (0.015 mole) of sodium nitrite in 20 ml. of water. The mixture was stirred for two hours at 60°–70° C. and then cooled. The white solid which had formed during the course of the reaction was separated by filtration and recrystallized from isopropyl ether yielding 2.5 g. (58 percent) of product melting at 105°–106° C.

Analysis: Calculated for $C_{13}H_{15}F_3N_2O_2$:
C,54.16; H,5.25; N,9.72
Found: C,53.92; H,5.23; N,9.56

EXAMPLE 4

1-Nitroso-3-(m-trifluoromethylphenyl)-3-pyrrolidinol

To a solution of 5.0 g. (0.022 mole) of 3-m-(trifluoromethylphenyl)-3-pyrrolidinol in 50 ml. of water and 1.9 ml. of concentrated hydrochloric acid at ca. 70° C. was added slowly a solution of 1.6 g. (0.023 mole) of sodium nitrite in 25 ml. of water. The reaction mixture was stirred for an additional 2 hours at the same temperature, cooled, and extracted with benzene. The combined extracts were washed, dried over magnesium sulfate and the solvent evaporated at reduced pressure. The residual oil which crystallized on trituration with isopropyl ether was recrystallized from the same solvent yielding 2.8 g. (49 percent) of white product melting at 104°–105° C.

Analysis: Calculated for $C_{11}H_{11}F_3N_2O_2$
C,50.77; H,4.26; N,10.77
Found C,50.74; H,4.23; N,10.84

EXAMPLE 5

1-Nitroso-3-(m-trifluoromethylphenyl)pyrrolidine

To a stirred solution of 5.8 g. (0.027 mole) of 3-(m-trifluoromethylphenyl)pyrrolidine in 54 ml. of 0.5 N hydrochloric acid at ca. 70° C. was added slowly a solution of 1.9 g. (0.027 mole) of sodium nitrite in 30 ml. of water. The reaction mixture was stirred for an additional 2 hours at the same temperature, then cooled and extracted with benzene. The combined extracts were washed successively with dilute hydrochloric acid and water and then dried over magnesium sulfate. After the solvent was evaporated from the dried solution the residual oil was distilled at 122°–124° C./0.05 mm. The light yellow, non-viscous oil weighed 2.9 g. (44 percent yield).

Analysis: Calculated for $C_{11}H_{11}F_3N_2O$:
  C,54.09; H,4.54; N,11.47
  Found: C,53.92; H,4.56; N,11.29

EXAMPLE 6

1-Nitroso-3-(3,5-dimethylphenoxy)pyrrolidine

To a solution of 30 g. (0.16 mole) of 3-(3,5-dimethylphenoxy)pyrrolidine in 164 ml. of 1.0 N hydrochloric acid maintained at ca. 70° C. was added slowly a solution of 11.3 g. (0.164 mole) of sodium nitrite in 40 ml. of water. The reaction mixture was stirred for an additional 2 hours at the same temperature, then cooled and extracted with chloroform. The combined extracts were dried and the solvent was evaporated from the dried solution at reduced pressure yielding 31.6 g. (92 percent) of an oil which was distilled at 120° C./.03 mm.

Analysis: Calculated for $C_{12}H_{16}N_2O_2$:
  C,65.43; H,7.32; N,12.72
  Found: C,65.29; H,7.37; N,12.62

FORMULATION AND ADMINISTRATION

Useful compositions containing at least one of the compounds according to the invention in association with a pharmaceutical carrier or excipient may be prepared in accordance with conventional technology and procedures. Thus, the compounds may be presented in a form suitable for oral or parenteral administration. For example, compositions for oral administration can be solid or liquid and can take the form of capsules, tablets, coated tablets and suspensions, such compositions comprising carriers and excipients conveniently used in the pharmaceutical art. Suitable tableting excipients include lactose, potato and maize starches, talc, gelatin, and stearic and silicic acids, magnesium stearate and polyvinyl pyrrolidone.

For parenteral administration the carrier or excipient may be a sterile, parenterally acceptable liquid; e.g., water or a parenterally acceptable oil, arachis oil contained in ampules.

Advantageously, the compositions may be formulated as dosage units, each unit being adapted to supply a fixed dose of active ingredients. Tablets, capsules, coated tablets and ampoules are examples of preferred dosage unit forms according to the invention. Each dosage unit adapted for oral administration can conveniently contain one to 50 mg. and preferably 5 to 20 mg. of the active ingredient. It is only necessary that the active ingredient constitute an effective amount; i.e., such that a suitable effective dosage will be obtained consistent with the dosage form employed. Obviously, several unit dosage forms may be administered at about the same time.

The following are examples of compositions formed in accordance with this invention.

1. Capsules — Capsules of 1, 20 and 50 mg. of active ingredient per capsule are prepared. With the higher amounts of active ingredient, reduction may be made in the amount of lactose.

| Typical blend for encapsulation | Per capsule, mg. |
|---|---|
| Active ingredient | 10.0 |
| Lactose | 291.7 |
| Starch | 129.0 |
| Magnesium stearate | 4.3 |
| Total | 435.0 |

2. Tablets — A typical formulation for a tablet containing 50 mg. of active ingredient per tablet follows. The formulation may be used for other strengths of active ingredient by adjustment of weight of dicalcium phosphate.

| 50 mg. Tablet Ingredients | Per Tablet, mg. |
|---|---|
| Active ingredient | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, starches and dicalcium phosphate when present. The blend is then granulated using water as granulating medium. The wet granules are passed through an eight-mesh screen and dried at 140°–160° F. The dried granules are passed through a ten-mesh screen, blended with the proper amount of calcium stearate, and the granules converted into tablets on a suitable tablet press.

| 3. Injectable—2% sterile solution | per cc |
|---|---|
| Active ingredient | 20 mg. |
| Preservative, e.g. chlorobutanol | 0.5% weight/volume |
| Water for injection | q.s. |

Prepare solution, clarify by filtration, fill into vials, seal and autoclave.

Various modifications in the compounds, compositions and methods of the invention will be apparent to one skilled in the art and may be made without departing from the spirit or scope thereof, and it is therefore to be understood that the invention is to be limited only by the scope of the appended claims.

What is claimed is:

1. A compound selected from the group consisting of a member having the formula:

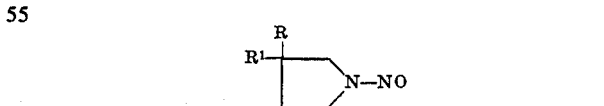

wherein;
  R is selected from the group consisting of hydrogen and hydroxy, and
  $R^1$ is selected from the group consisting of α-phenyl-α-hydroxybenzyl, α-lower-alkyl-α-hydroxybenzyl, α-lower-alkyl-α-hydroxy-p-trifluoromethylbenzyl, phenyl, trifluoromethylphenyl and 3,5-di-lower-alkylphenoxy.

2. A compound of claim 1 which is 1-nitroso-α,α-diphenyl-3-pyrrolidinemethanol.

3. A compound of claim 1 which is 1-nitroso-α-propyl-α-phenyl-3-pyrrolidinemethanol.

4. A compound of claim 1 which is 1-nitroso-α-methyl-α-(p-trifluoromethylphenyl)3-pyrrolidinemethanol.

5. A compound of claim 1 which is 1-nitroso-3-(m-trifluoromethylphenyl)3-pyrrolidinol.

6. A compound of claim 1 which is 1-nitroso-3-(m-trifluoromethylphenyl)pyrrolidine.

7. A compound of claim 1 which is 1-nitroso-3-(3,5-dimethylphenoxy)pyrrolidine.

* * * * *